United States Patent Office 3,422,119
Patented Jan. 14, 1969

3,422,119
CYCLIC AROMATIC CARBONATE DIMERS
Robert J. Prochaska, Stockbridge, Mass., assignor to General Electric Company, a corporation of New York
No Drawing. Filed June 3, 1963, Ser. No. 284,810
U.S. Cl. 260—340.2     1 Claim
Int. Cl. C07d 19/00

This invention relates to aromatic carbonates and more particularly concerns a novel and improved process for preparing cyclic aromatic carbonate dimers.

Cyclic carbonates have been known and studied for many years since ethylene carbonate was first prepared by Nemirowski in 1883 [J. Prakt. Chem. (2) 28, 439 (1883)]. This stable, crystalline solid has been definitely established to be the 5-membered ring compound. In 1898, Einhorn [Ann. 300,135 (1898)] prepared a cyclic carbonate from catechol and phosgene. This simple 5-membered cyclic aryl carbonate and similar compounds prepared from substituted catechols are the only cyclic aryl carbonate monomers reported in the literature. They are, however, highly stable compounds incapable of being polymerized to form high molecular weight polycarbonates. In 1930, Carothers and van Natta [JACS 52, 314–26 (1930)] prepared the 6-membered cyclic trimethylene carbonate and succeeded in isolating the cyclic dimeric tetramethylene carbonate. This work was continued by Carothers, Dorough and van Natta [JACS 54, 761–772 (1932)] in a study of the reversible polymerization of 6-membered cyclic esters, including cyclic aliphatic carbonates. They had concluded at the time that any attempt to prepare cyclic esters having more than 6 atoms in the ring from open chain polymeric compounds led to linear polymers. In 1933, Hill and Carothers [JACS 55, 5031–39 (1933)] succeeded in preparing many cyclic aliphatic carbonates by depolymerizing the corresponding polymers under a vacuum. However, they were unable to prepare any monomeric cyclic carbonates having 7 or 8 atoms in the ring by their depolymerization technique. The preparation of cyclic tetrameric carbonates by condensing p-hydroxy bisphenols with their chloroformate derivatives is described by Schnell and Bottenbruch in Die Makromolekulare Chemie 57, 1–11 (1962). However, the tetramers are the only cyclic carbonate materials reported by the authors who state that they were unable to prepare any monomeric or dimeric cyclic aromatic carbonates.

In my copending application, Ser. No. 161,306, filed Dec. 21, 1961 and assigned to the same assignee as the present invention, there is disclosed a new class of aromatic cyclic carbonate monomers which may be polymerized to provide high molecular weight aromatic carbonate polymers. Generally speaking, these cyclic carbonate monomers are 7 and 8 membered ring compounds corresponding to the general formula (I)

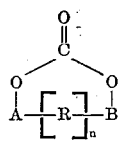

wherein A and B are aromatic radicals, R is attached to A and B ortho relative to the respective oxygen atoms and is selected from the group consisting of an alkylidene group, a sulfone group, a carbonyl group, a sulfoxy group, sulfur, and oxygen; and $n$ is a whole number from 0 to 1. Such aromatic cyclic carbonate monomers may be easily and conveniently converted to high molecular weight carbonate polymers by heating these cyclic monomers in the presence of a catalyst, such as an alkali metal or an alkali metal hydroxide, for example. Other suitable catalysts which may be used, as well as specific mehods for polymerizing these aromatic cyclic carbonate monomers to provide high molecular weight aromatic polymers, are disclosed in my above referred to copending application.

In my copending application Ser. No. 247,292 filed Dec. 26, 1962 and also assigned to the same assignee as the present invention, there is disclosed a new class of novel and useful cyclic aromatic carbonate dimers corresponding to the general formula (II)

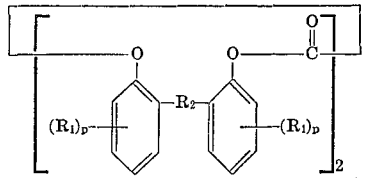

where $R_1$ is selected from the class consisting of halogen, such as chlorine and bromine; and alkyl radicals such as, for example, methyl, ethyl, propyl, butyl, tert-butyl; and $R_2$ is an alkylidene group such as, for example, methylene, ethylidene, and propylidene, and $p$ is a whole number from 0 to 2.

Such dimeric carbonates find utility in the production of linear high molecular weight polycarbonate resins, and may be prepared by contacting, in the presence of an acid acceptor, a dihydric phenol of the formula

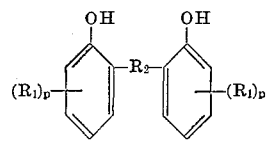

with a carbonyl halide to provide a reaction mixture which may contain, in addition to the desired cyclic dimeric carbonate, a cyclic carbonate monomer of the formula (III)

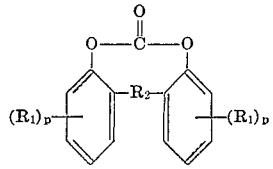

as well as a linear polymer containing recurring structural units of the formula (IV)

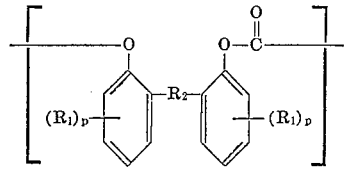

where $R_1$, $R_2$ and $p$ have the meanings given above.

The above method for preparing cyclic dimeric carbonates of the type falling within the scope of Formula II requires isolation of the desired dimeric product from the reaction mixture containing the cyclic monomer of Formula III and the linear polymer containing recurring structural units of Formula IV.

I have now discovered a simplified process for preparing such cyclic carbonate dimers by which the side reactions leading to the production of cyclic monomer and linear polymer may be substantially eliminated or substantially reduced and the dimeric carbonate produced in a much purer form and in greater yield than heretofore attainable with the use of previous methods of preparation. In addition I have discovered that a new class of unsymmetrical aromatic cyclic dimeric carbonates may be prepared by my new process.

Briefly stated, the present invention provides a process for preparing cyclic carbonate dimers having the structure (V)

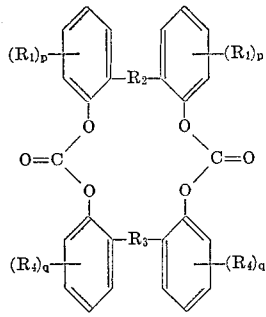

which process comprises reacting in the presence of an acid acceptor, a dihydric phenol of the formula (V)

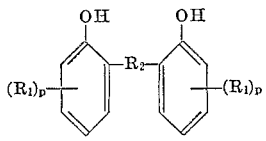

with a bishaloformate of a dihydric phenol of the formula (VI)

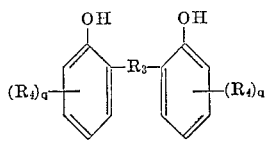

where $R_1$ and $R_4$ are the same or different and are selected from the group consisting of halogen, such as chlorine and bromine, for example, and alkyl radicals as, for instance, methyl, ethyl, butyl, propyl and tert-butyl; and $R_2$ and $R_3$ are the same or different and are alkylidene groups such as, for example, methylene, ethylidene and propylidene; and $p$ and $q$ are the same or different and are whole numbers from 0 to 2.

The symmetrical aromatic cyclic carbonate dimers prepared by the process of the invention will conform to the formula (VII)

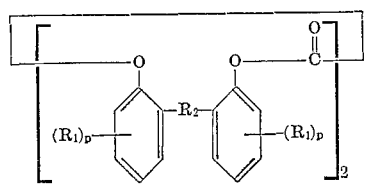

where $R_1$, $R_2$ and $p$ all have the meanings given above, when the bishaloformate reactant employed in the reaction with the dihydric phenol is the bishaloformate derivative of that dihydric phenol, i.e., where, in Formulas V and VI above, $R_2$ and $R_3$ are the same and $R_1$ and $R_4$, as well as $p$ and $q$ are the same.

Additionally, novel unsymmetrical aromatic cyclic dimeric carbonates of the invention conforming to the formula

VIII

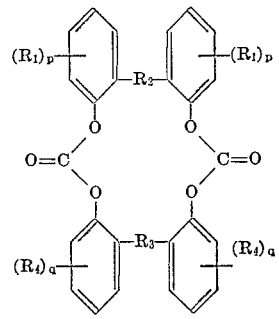

may be prepared by employing in the process above described a bishaloformate of a dihydric phenol which is different from the dihydric phenol used in the reaction with the bishaloformate, i.e., where in Formulas V, VI and VIII above at least one of the members $R_1$, $R_2$, and $p$, is different from at least one of the corresponding members $R_3$, $R_4$, and $q$.

As will be appreciated by those skilled in the art, the bishaloformate derivatives of the bisphenols of Formula VI will correspond to the general formula

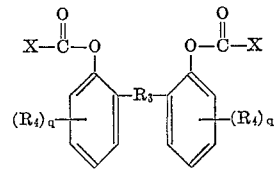

where $R_3$, $R_4$ and $q$ have the meanings given above, and X is halogen, such as chlorine and bromine, for example.

The bishaloformate employed in the preparation of the cyclic dimeric carbonates in accordance with the present invention may be bischloroformates or bisbromoformates of dihydric phenols falling within the scope of Formula VI. The bischloroformates are generally preferred since they may be prepared easily by reacting the dihydric phenol with phosgene. For example, the bischloroformate of 2,2′ dihydroxy 5,5′ dimethyldiphenylmethane may be conveniently obtained by reacting that compound with phosgene by the same method, as described in British patent 613,280, used in the preparation of the bischloroformate of 2,2 bis-(4-hydroxyphenyl) propane.

The process of the invention may be successfully carried out at temperatures ranging from values below about −10° C. to values above about 75° C. However, higher yields of the desired cyclic product may be obtained by maintaining the temperature of reaction below the reflux temperature (at atmospheric pressure) of the reaction mixture, and preferably below 20° C.

In general, the acid acceptor useful in the practice of the invention may be organic or inorganic in nature. Examples of such inorganic acid acceptors are the oxides and hydroxides of alkali and alkaline earth metals such as, for instance, the oxides and hydroxides of sodium, potassium, magnesium, barium and calcium. Examples of organic acid acceptors are the aliphatic tertiary amines, such as, for example, trimethylamine; triethylamine; tripropylamine; as well as aromatic tertiary amines, such as, for example, triphenylamine; N,N dimethylaniline; and N,N dimethyl-p-nitroaniline. Included also are the heterocyclic tertiary amines such as, for example, pyridine, picoline; pyridazine, pyrimidine, pyrazine, quinoline; and isoquinoline. Mixtures of two or more of such tertiary amines may also be used. In many instances, the tertiary amine employed may act as a solvent for reactants, as in the case of pyridine, for example. In the event the amine does not act in this capacity, a common solvent for the reactants, which is inert in the sense that it does not enter into the reaction, may be used. Examples of such solvents are methylene chloride, ethylene dichloride, propylene dichloride and chlorobenzene. Although the quantity of solvent used may vary within wide limits it has been discovered that higher yields of the desired dimeric cyclic carbonate may be obtained when the weight ratio of the reactants (i.e. weight of dihydric phenol plus bishaloformate of dihydric phenol) to solvent is less than about 0.2, and preferably less than about 0.05.

The cyclic aromatic carbonate dimers prepared by the process of this invention may be polymerized to provide linear, high molecular weight aromatic polycarbonate resins of the type which have achieved wide acceptance in the plastics industry. Such linear high molecular weight polymers may be prepared by heating the cyclic aromatic carbonate dimers for a period of time, varying inversely with the temperature, until a high molecular weight linear polymer is produced. A catalytic amount of a basic material may be added to accelerate the speed of the polymerization and to reduce the temperature at which the polymerization is initiated.

Examples of the basic materials which may be used to increase the rate at which polymerization may be initiated are the alkali metals, such as sodium, potassium, rubidium, cesium; alkali metal hydroxides, such as sodium hydroxide, potassium hydroxide; alkali metal carbonates, such as sodium carbonate, potassium carbonate; alkali metal alkoxides, such as sodium methoxide, potassium ethoxide; alkali metal aryloxides, such as sodium phenate, dipotassium bisphenate; quaternary ammonium hydroxides, such as tetramethylammonium hydroxide, cetyl triethylammonium hydroxide, tetra n-heptyl ammonium hydroxide, tetraethyl ammonium hydroxide; organometallics such as phenyl lithium, butyl lithium, and Grignard reagents, such as phenyl magnesium bromide.

In general, the polymerization of the cyclic carbonate dimers to linear aromatic carbonate polymers may be conducted either in a fusion cook or in a solvent system. As will be appreciated by those skilled in the art, it is possible to employ two or more different cyclic dimers in combination with one another, or in combination with one or more different aromatic cyclic monomers of the type falling within the scope of Formula I above (in either polymerization technique), in the event a carbonate copolymer rather than a homopolymer is desired.

In the event the fusion cook technique is employed, temperatures as high as 350° C. may be required to initiate the polymerization reaction, depending upon the particular cyclic dimer and catalyst that are used. On the other hand, should the reaction be conducted in a solvent system, polymerization may be successfully initiated at temperatures as low as 100° C. or lower, although temperatures ranging from about 110° C. to the temperature at which the solvent refluxes (at atmospheric pressure) are generally preferred, since the maximum degree of polymerization of the cyclic carbonates into linear form has been found to occur within that temperature range.

The reaction time at any given temperature will vary with the type and amount of catalyst, if any, that is used, and the amount, if any, of solvent present. Generally speaking, the polymerization reaction is permitted to continue at a fixed temperature until the viscosity of the resulting polymer or polymer solution reaches a maximum, thus insuring as complete a degree of polymerization as possible. In the case of the fusion cook, heating for a period of from a few minutes to a few hours will often suffice, and the increase in viscosity may be observed visually. Should a solvent system be employed, the viscosity of the polymer will reach a specific maximum after a period of time which again may last from but a few minutes to several hours, depending again upon the specific cyclic carbonate used and the amount of solvent and catalyst employed. Continued heating of the formed polymer after the maximum viscosity is attained will only tend to decrease this value. The period of heating any given cyclic at a fixed temperature until this maximum is reached may be ascertained easily by periodic tests made on the viscosity of the polymer formed. Generally, a period of heating of from less than one hour to four hours or more will be sufficient to achieve this maximum value.

Any organic solvent, inert in the sense that it does not enter into the polymerization reaction and preferably one in which the resulting linear polymer is soluble, may be employed. Examples of suitable solvents are: chlorinated biphenyls containing from 1 to 10 chlorine atoms on the aryl nucleus; chlorinated diphenyl ethers containing from 1 to 10 chlorine atoms on the aryl nucleus; diphenyl ether, ethylene dichloride, propylene dichloride, chlorobenzene, chloroform, pyridine, and methylene chloride. The catalytic amount (i.e., the amount sufficient to initiate polymerization) of catalyst used may also vary within a wide range, depending upon the temperature of reaction, the amount of solvent employed, and the particular cyclic dimeric carbonate which is to be polymerized. Satisfactory results have been obtained by employing as little as 0.001 percent by weight of the catalyst, based upon the weight of the cyclic carbonate to be polymerized. Generally, however, amounts varying from 0.01 percent to about 3 percent by weight are advantageously used. Although the catalyst may be added in amounts greater than 3 percent, such addition is neither necessary nor practical, since it tends to reduce the molecular weight of the polymer formed and to contaminate the resin product which is obtained. As will be appreciated by those skilled in the art, molecular weight regulators may be added to the cyclic dimer in either polymerization technique. Examples of such regulators are monofunctional phenols, i.e., phenol, p-tertiary butyl phenol; monofunctional alcohols, i.e., methanol, ethanol.

In order that those skilled in the art may better understand how the present invention may be practiced, the following examples are given by way of illustration and not by way of limitation. All parts and percentages are by weight unless otherwise noted. Values within 10 percent of the calculated molecular weight of the cyclic dimeric carbonate were deemed to be within the acceptable range of experimental error involved in such molecular weight determinations.

EXAMPLE 1

This example illustrates the preparation of a cyclic dimeric carbonate by the method disclosed in my copending application S.N. 247,292 referred to above.

114 parts 2,2'-dihydroxy-5,5'-dimethyldiphenylmethane were dissolved in 2,280 parts methylene chloride (5 percent solids based on $CH_2Cl_2$) and 118 parts pyridine. The stirred solution was cooled in an ice bath to 0°–5° C. and phosgene bubbled in at a rate of one part per minute until the reaction was complete (55 minutes). The reaction mixture was washed first with an HCl-water mixture to remove pyridine, followed by several water washes to remove pyridine hydrochloride. The methylene chloride solution was dried over anhydrous calcium chloride and evaporated to dryness in an air stream. The residual solid was slurried with carbon tetrachloride and the solution separated from the solid phase by filtration. The solids were set aside, the $CCl_4$ solution evaporated to dryness and the resulting residue-reslurried with carbon tetrachloride. This second solid residue was combined with the first residue, and the solids mixture heated at reduced pressure. The cyclic monomeric carbonate was carefully sublimed at 90–150° C. at less than 1 mm. of mercury. After all the monomeric cyclic carbonate was sublimed the residue was recrystallized twice from benzene and once from carbon disulfide to yield a white crystalline solid, micromelting point 274.5–275.0° C. on Kofler hot stage between cover glasses washed in boiling hydrochloric acid. Infrared analysis showed an absence of hydroxyl and a strong carbonate absorption. The following analytical data confirmed the identification of this solid as the dimeric 2,2'-(5,5'-dimethyldiphenylmethane) cyclic carbonate:

Calculated: H, 5.55%; C, 75.57%; M.W. 508 (as dimer). Found: H, 5.68%; C, 75.78%; M.W. 542 (isothermal distillation); 472 (boiling point elevation, CHCl₃).

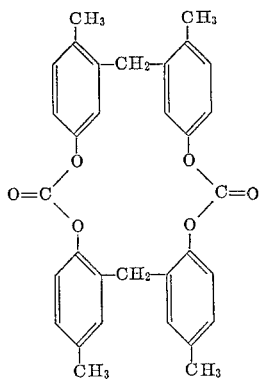

EXAMPLE 2

This example illustrates the preparation of the bishaloformate of a dihydric phenol of the type used in the process of this invention.

107.6 parts of 2,2'-dihydroxy-5,5'-dichlorodiphenylmethane were dissolved in 347 parts of toluene and the solution cooled to −8° C. 118.8 parts of phosgene were bubbled into the solution over a two hour period with stirring. 97.4 parts of dimethylaniline were dissolved in an equal amount of toluene and the mixture added dropwise to the bishpenol-toluene solution over a period of an hour while the temperature was maintained at 0° C. The reaction mixture was allowed to stand overnight and warm to room temperature. The excess phosgene was removed with water and the toluene layer washed twice with dilute hydrochloric acid and three times with water. The toluene solution was then dried over anhydrous MgSO₄ and two-thirds of the toluene distilled off under reduced pressure. On cooling the residual liquor crystals separated and were filtered off and recrystallized twice from heptane. The resulting crystalline solid, melting point 83–85° C. was identified as the desired bischloroformate by infrared analysis and the following elemental analyses.

Calculated: H, 2.05%; C, 45.72%; Cl, 35.99%. Found: H, 2.27%; C, 46.00%; Cl, 36.01%.

EXAMPLE 3

This example illustrates the preparation of another bishaloformate of a dihydric phenol of the type employed in the process of the invention.

91.2 parts of 2,2' dihydroxy 5,5' dimethyldiphenylmethane were dissolved in 345 parts of toluene and the solution cooled to 0–5° C. 118.8 parts of phosgene were bubbled into the solution and the temperature maintained at 5–8° C. After the addition of phosgene was completed the solution temperature was reduced to −10° C. and 97.4 parts of dimethylaniline dissolved in an equal quantity of toluene were added dropwise with stirring over a period of 65 minutes. After an additional 2 hours of stirring the reaction mixture was allowed to stand for 48 hours. The excess phosgene was reacted with water and the toluene layer washed twice with dilute (10 percent) hydrochloric acid solution and then three times with water. After drying over anhydrous magnesium sulphate, the toluene was distilled off under reduced pressure. When the solution was reduced to one quarter of its original volume it was cooled to yield a white crystalline solid. This solid was recrystallized twice from heptane to yield the purified bischloroformate of 2,2' dihydroxy 5,5' dimethyldiphenylmethane, melting point 65–67° C., having the following analysis:

Calculated: H, 3.99%; C, 57.81%; Cl, 20.08%. Found: H, 4.17%; C, 58.19%; Cl, 20.22%.

EXAMPLE 4

This example illustrates the preparation of a cyclic dimeric carbonate by the process of this invention.

A solution of 19.7 parts of the bischloroformate of 2,2'-dihydroxy-5,5'-dichlorodiphenylmethane (prepared in Example 2) in 668 parts methylene chloride, and a solution of 12.7 parts of 2,2'-dihydroxy-5,5'-dichlorodiphenylmethane and 11.9 parts of pyridine in 668 parts methylene chloride were added dropwise simultaneously with stirring into 1,336 parts methylene chloride over a period of 2¾ hours. An insoluble solid separated from solution and was filtered off. This solid was recrystallized twice from o-dichlorobenzene, once from tetrachloroethane and sublimed at 280–300° C. at 0.5 mm. to yield a white crystalline solid, melting point 365–368° C. On infrared analysis this material showed an absence of hydroxyl and a strong band in the carbonate region. This information, coupled with the following analytical data, confirmed the identification of this product as the cyclic dimeric carbonate of 2,2'-dihydroxy-5,5' dichlorodiphenylmethane.

Calculated: H, 2.73%; C, 56.97%; Cl, 24.03%. Found: H, 2.74%; C, 56.66%; Cl, 23.93%.

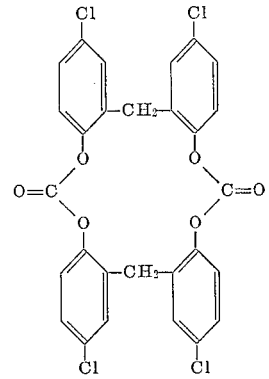

EXAMPLE 5

This example illustrates the preparation of a symmetrical cyclic carbonate dimer by the process of the invention.

11.4 parts of 2,2' dihydroxy 5,5' dimethyldiphenylmethane and 11.9 parts of pyridine dissolved in 500 parts of methylene chloride, and 18.5 parts of the bischloroformate from Example 3 dissolved in 500 parts of methylene chloride were added dropwise at equal rate with stirring over a period of 4 hours to a reaction vessel containing 1336 parts of methylene chloride at room temperature. The mixture was stirred for an additional three hours after the final addition and allowed to stand overnight. The methylene chloride solution was washed with a 10 percent phosphoric acid solution, then washed with water and finally dried over anhydrous magnesium sulfate. The methylene chloride was blown off with an air stream to yield a cream colored paste. This paste was dissolved in hot benzene and cooled to yield a white crystalline solid. The solid was recrystallized twice from benzene to yield a product, melting point 276–279° C., uncorrected, which was shown to be identical to the cyclic dimeric 2,2' (5,5' dimethyldiphenylmethane) carbonate as prepared in Example 1 by infrared analysis, carbon, hydrogen analysis, X-ray diffraction powder diagram and molecular weight determination.

EXAMPLE 6

This example illustrates the preparation of an unsymmetrical cyclic dimeric carbonate by the process of the invention.

A solution of 19.7 parts of the bischloroformate, prepared in Example 2, in 668 parts methylene chloride, and a solution of 11.4 parts of 2,2' dihydroxy-5,5' dimethyldiphenylmethane and 11.9 parts of pyridine in 668 parts methylene chloride were added dropwise, simultaneously with stirring into 1336 parts methylene chloride over a period of 2¾ hours. The reaction mixture was washed with dilute hydrochloric acid and water and dried over anhydrous MgSO₄. As the methylene chloride was evaporated an insoluble solid separated from solution. Several fractions of this solid were separated by filtration as the methylene chloride was removed. This solid was re-recrystallized twice from o-dichlorobenzene, once from tetrachloroethane and sublimed to yield a white crystalline solid, melting point 330–333° C. On infrared analysis, this material showed an absence of hydroxyl and a strong absorption in the carbonate region. This information coupled with the following analytical data confirmed the identification of this product as the unsymmetrical cyclic dimeric carbonate.

Calculated: H, 4.04%; C, 65.58%; Cl, 12.91%. Found: H, 4.03%; C, 65.86%; Cl, 12.83%.

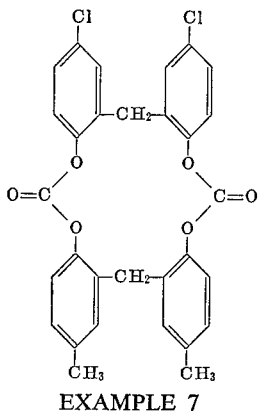

EXAMPLE 7

This example illustrates the preparation of a cyclic dimeric carbonate by the process of the invention with the use of a strong base as an acid acceptor.

A solution of 18.5 parts of the bischloroformate of 2,2′ dihydroxy-5,5′- dimethyldiphenylmethane in 668 parts methylene chloride and a solution of 11.4 parts of 2,2′ dihydroxy-5,5′-dimethyldiphenylmethane in 668 parts methylene chloride were added dropwise simultaneously with stirring into 1336 parts methylene chloride containing 6 parts of finely ground sodium hydroxide powder over a two hour period. The reaction mixture was stirred overnight, washed with dilute hydrochloric acid and water and dried over anhydrous MgSO₄. The methylene chloride was evaporated to yield a semi-solid residue. This residue was recrystallized once from carbon tetrachloride and once from benzene to yield a white crystalline solid which was identical to the cyclic dimeric 2,2′ (5,5′ dimethyldiphenylmethane) carbonate identified in Example 1.

EXAMPLE 8

This example illustrates a method for polymerizing a cyclic carbonate dimer of the type prepared by the process of the invention.

0.25 part of the cyclic dimeric carbonate of 2,2′ dihydroxy 5,5′ dimethyldiphenylmethane was placed in a glass tube and melted to a clear, light yellow liquid in a bath maintained at 280° C. When the tube was removed from the bath and allowed to cool, the melt crystallized with no evidence of polymer formation. When the tube was replaced in the hot bath, the dimer remelted. A minute quantity of anhydrous potassium carbonate (approximately .001 percent) was introduced to the hot melt and a dramatic change was noted. The fluid melt gradually increased in viscosity and after 15 minutes heating was quite viscous so that fibers could be drawn from the melt. The viscous polymer was allowed to cool and dissolved in methylene chloride. Part of the methylene chloride solution was precipitated in methanol to yield a fibrous polymer and part was cast on a glass plate to yield a clear, flexible film.

The present invention provides a novel and improved process for preparing symmetrical cyclic aromatic carbonate dimers. The process may also be used to prepare novel unsymmetrical cyclic aromatic carbonate dimers. Both types of such dimers are useful in the production of linear high molecular weight aromatic polycarbonate resins. Since the polymerization of the cyclic carbonate dimers to form high molecular weight polycarbonate resins neither requires the use of a toxic carbonyl halide nor results in the evolution of a corrosive gas, such as HCl, the linear, high molecular weight polycarbonate resins may be prepared from the cyclic carbonate dimers at their place of use. Accordingly, large and intricate castings of polycarbonate resin may be prepared by polymerizing a cyclic carbonate dimer in situ at the particular installations requiring such resin castings. In addition, the cyclic dimers may be employed as potting compounds and in the production of coatings and films by in situ polymerization techniques.

The polycarbonate resins prepared from the cyclic carbonate dimers obtained by the process of the invention have utility in the same applications as previously known aromatic carbonate polymers. For example, they are useful in the manufacture of films, fibers, molded or extruded parts, and in the preparation of surface coatings for use in structural, decorative and electrical applications.

What I claim as new and desire to secure by Letters Patent of the United States is:

1. An unsymmetrical cyclic dimeric carbonate having the structure

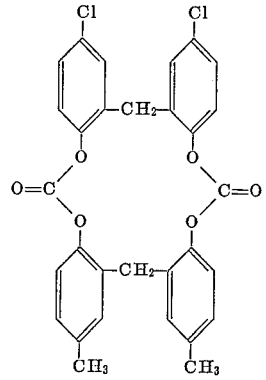

References Cited

UNITED STATES PATENTS 3,155,683  11/1964  Moody _____ 260—340.2
3,221,025  11/1965  Prochaska _____ 260—340.2 X

FOREIGN PATENTS 772,627  4/1957  Great Britain.
613,280  11/1948  Great Britain.
620,620  7/1962  Belgium.

OTHER REFERENCES

Schnell et al.: Makromolekulare Chemie, vol. 57, pp. 1–11, 1962.

Groggins: Chemical Engineering Series, 4th Ed., 1952, p. 598.

NORMA S. MILESTONE, *Primary Examiner.*

U.S. Cl. X.R.

260—30.2, 33.2, 33.8, 77.5, 479